June 26, 1962 J. R. NOLAN 3,040,919
SIDE LOADING VEHICLE AND PORTABLE CONTAINER THEREFOR
Filed March 7, 1960 2 Sheets-Sheet 1

JAMES R. NOLAN
INVENTOR.

BY *Herbert J. Brown*

ATTORNEY

June 26, 1962 J. R. NOLAN 3,040,919
SIDE LOADING VEHICLE AND PORTABLE CONTAINER THEREFOR
Filed March 7, 1960 2 Sheets-Sheet 2
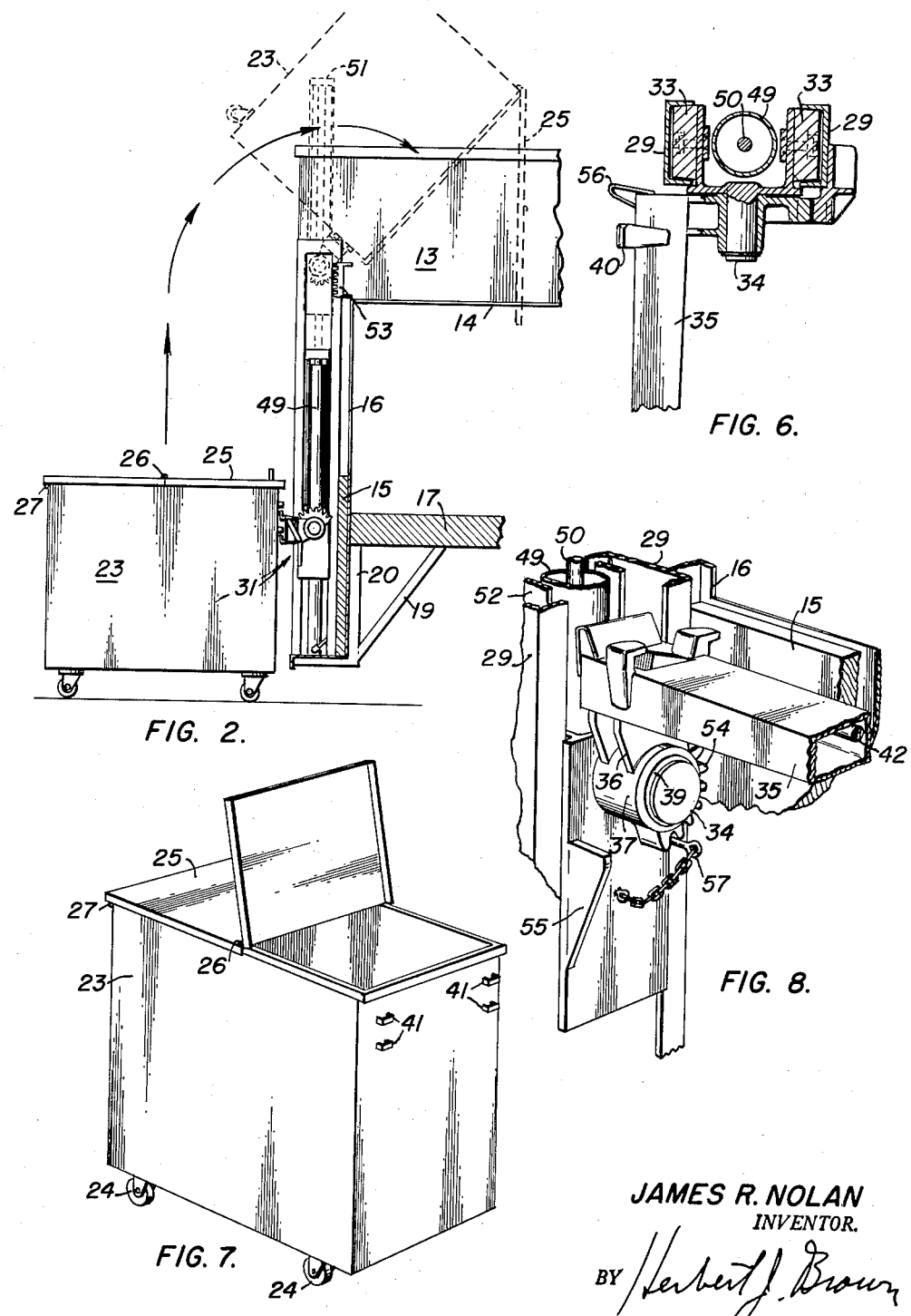
JAMES R. NOLAN
INVENTOR.
BY Herbert J. Brown
ATTORNEY United States Patent Office 3,040,919
Patented June 26, 1962

3,040,919
SIDE LOADING VEHICLE AND PORTABLE
CONTAINER THEREFOR
James R. Nolan, Fort Worth, Tex., assignor to Fruehauf
Trailer Company, Detroit, Mich., a corporation of
Michigan
Filed Mar. 7, 1960, Ser. No. 13,365
5 Claims. (Cl. 214—302)

This invention relates to side loading mechanisms for trucks, trailers and the like and has reference to power operated means whereby a portable container may be raised, tilted and the contents dumped into a hauling body. The invention is expecially intended for use in conjunction with garbage trucks having powered packer blades longitudinally movable in the truck bodies for moving refuse to one end thereof to make room for additional loading and whereby the bodies may be filled to substantially maximum capacity.

An object of the invention is to provide a powered mechanism for loading vehicles at the sides thereof and whereby a single operator may easily raise and dump relatively heavy loads.

Another object is to provide a mechanism for loading garbage trucks which is safe in its use and operation by reason of loading at the side or curb line of a street.

Another object is to provide a single track assembly and hydraulic arrangement at one side of a side loading door for economy of construction.

A further object is to provide a portable container and lift combination for garbage trucks or the like and wherein the container is automatically latched on the lift while being raised and tilted.

A still further object is to provide a container for the described purpose which may be water tight, wherein the lid is hinged intermediate its ends for half opening the lid when filling the container, and wherein the lid is additionally hinged along its rear edge for full opening when the container is being emptied.

These and other objects will become apparent from the following description and accompanying drawings, therein:

FIGURE 2 is a broken sectional and elevational view taken approximately on line 2—2 of FIGURE 1 and showing a container attached to the lift bar of the invention and additionally showing the dumping position of the container by means of dotted lines.

FIGURE 6 is a broken plan view of the lift bar and showing the track assembly and cylinder in transverse section.

FIGURE 7 is a perspective view of a container comprising a part of the invention, and FIGURE 8 is a broken perspective view of the track assembly, guide assembly, and particularly showing the mounting of the lift bar.

Figures 1, 3, 4, 5:
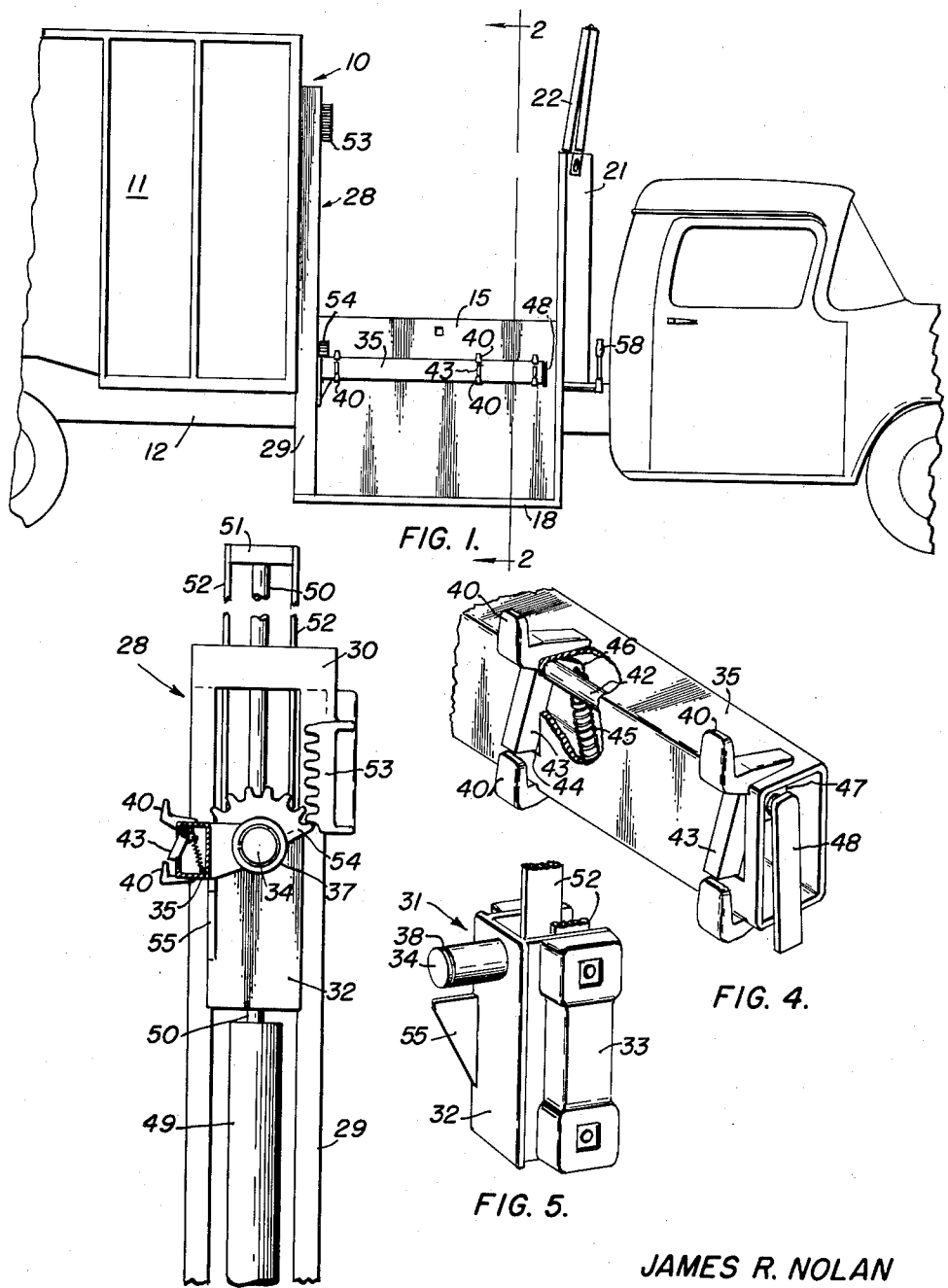
FIGURE 1 is a broken side elevational view of a truck showing the present side loading mechanism installed thereon.
FIGURE 3 is an enlarged broken elevation of the track assembly, cylinder and container dumping mechanism.
FIGURE 4 is an enlarged broken perspective view of the lift bar and container latches.
FIGURE 5 is a perspective view of the guide assembly which operates in the track assembly.

The form of the invention shown is mounted on the front right side of a packer type garbage truck body 10. The truck body 10 is of the type having a large rectangular container 11 on the rear of the truck frame 12 and includes a forward wall 13 (FIGURE 2) and a rectangular opening 14 through which loose material is loaded by means of a powered packer blade, not shown. The forward portion of the body 10 includes side doors 15 which slide in vertical guides 16 provided in the body for that purpose. The guides 16 extend downwardly below the level of the truck bed 17 to a step 18 supported beneath the truck bed by braces and brackets 19 and 20. It is to be noted that the tops of the doors 15 are above the truck bed even when the doors are in their lowermost positions. Other details of the truck body 10 shown include a transverse forward body end 21 and a hinged cover 22 adapted to engage the edges of the doors 15 when the latter are in their fully raised positions.

The present invention is directed to a lifting and dumping mechanism for portable containers 23 such as shown in FIGURES 2 and 7. The containers 23 are rectangular and are mounted on casters 24. The container lids 25 have transverse hinges 26 intermediate their forward and rear ends, and the rear ends have hinges 27 connecting the lids with the rear upper edges of the containers 23. As will become apparent, the described hinged arrangement has to do with convenience when placing material in the containers 23 from time to time, and full opening when the contents are dumped in the truck. In practice one or more containers are placed at designated locations, but are lifted one at a time when transferring the contents to the hauling vehicle.

The present lifting device includes a vertical track assembly 28 comprised of opposing spaced channels 29 mounted on the step 18 and also secured to the forward wall 13 of the hauling container 11. The channels 29, which are parallel with each other, are arranged inwardly and outwardly with reference to the truck and are secured at their upper ends by means of at least one cross member 30 secured to the outer sides thereof. A guide assembly 31, shown in detail in FIGURE 5, is mounted for vertical sliding movement between the opposing channels 29, and which, guide assembly is comprised of a hollow rectangular body 32 which is open along one side so as to be substantially U-shaped in cross section. Opposite sides of the body 32 are provided with guide shoes 33 which are shaped to conform with and slidably engage the channels 29 of the track assembly 28. The intermediate side or face of the body 32 has a projecting stub shaft 34 for rotatably supporting a hollow horizontal lift bar 35 which is rectangular in cross section. The lift bar 35 has parallel brackets 36 which are integral with a cylindrical bearing 37 mounted on the stub shaft 34. The outer end of the stub shaft 34 is grooved, as at 38, for receiving a locking ring 39 which, in turn, retains the bearing 37 against longitudinal displacement.

Upper and lower longitudinally spaced pairs of hooks 40 project from a side of the lift bar 35 and are adapted to engage corresponding projecting loops 41 on the forward surface of each container 23 near the top thereof. Within the lift bar 35 and adjacent the normally upper hooks 40 there extends a horizontal rod 42 having latches 43 mounted thereon, and which latches extend outwardly through openings 44 in the lift bar so as to engage the upper edges of the lower loops 41 on the container 23. The latches 43 are urged outwardly by means of a tension spring 45, one end of which is engaged within the lower portion of the lift bar 35 and the other end engaged on the extending end of a lever arm 46 mounted on the rod 42. The rod 42 is mounted in bearings 47 and has a lever 48 on its end remote from the track assembly 28.

The guide assembly is raised and lowered by a hydraulic cylinder 49 vertically positioned between the track channels 29 and mounted on the step 18. The piston rod 50 extends upwardly from the cylinder 49 where it is provided with a cross head 51 which, in turn, has drawbars 52 at the ends thereof extending downwardly where the same is connected with opposing sides of the guide assembly body 32.

A feature of the invention has to do with a tilting mechanism comprised of a gear rack 53 secured to the inner channel 29 at the upper end thereof and in alignment with the cylindrical bearing 37 mounted on the stub shaft 39. An integral segment gear 54 projects from the bearing 37 and which gear is substantially at a right angle with reference to the side of the lift bar including the hooks 40. Thus, when the guide assembly 31 is raised with container 23 attached, contact of the segment gear 54 with the rack gear 53 causes a tilting action when the lift bar 35 nears its uppermost position.

Other details shown in the drawings include a bracket like stop 55 projecting from the face 32 of the guide assembly 31 and at the near corner thereof and whereon the lift bar 35 rests when not in its tilted position. Converging spring guides 56 are provided on the ends of the lift bar 35 adjacent the pairs of hooks 40 for guiding the container 23 into place when engaging the same for a lifting operation, and a latch pin and chain 57 may be provided on the face 32 of the guide assembly 31 for engaging teeth of the segment gear 54 when the lift bar 35 is lowered, as when the truck is traveling from one pickup location to another. The hydraulic system is conventional and is not, therefore, shown in detail; however, a preferred lever arrangement 58 is shown at the right of the door 15 in FIGURE 1 for convenience when operating the cylinder actuating valve, not shown.

In operation, a container 23 is moved to the lowered lift bar 35 and by raising the latter the hooks 40 are caused to engage the container loops 41. Continued upward movement of the lift bar 35 causes the segment gear 54 to engage the rack gear 53, thus causing a tilting of the lift bar with the result that the contents of the container are dumped into the truck. It is to be noted that latches 43 prevent the container from dropping when in its tilted position. Reverse action of the cylinder 49 lowers the container 23 and after the same comes to rest on a sidewalk or other surface the latches 43 are released whereby the container may be wheeled away.

The invention is not limited to the exemplary construction herein shown and described, but may be made in various ways within the scope of the appended claims.

What is claimed is:

1. A loading device for a vehicle including a hauling bed, said loading device comprising: a track assembly vertically mounted on said vehicle at one edge of said bed and extending upwardly thereabove, a guide assembly slidably mounted in said track assembly, a horizontal lift bar pivotally mounted on said guide assembly as its sole support and extending from said track assembly as a cantilevered construction and in a direction substantially parallel with said edge of said bed, a portable container, means detachable securing said portable container to said lift bar, a rack gear mounted on said track assembly at the top and at one side thereof, a segment gear rigid with and mounted to turn with said lift bar and mesh with said track gear, a hydraulic cylinder parallel with said track assembly and having its piston rod extending upwardly therefrom, a cross head on the extending end of said piston rod and draw bars connecting the sides of said cross head with said guide assembly.

2. A loading device for a vehicle as defined in claim 1, and wherein said means detachably securing said container to said lift bar is comprised of loops on said container and hooks on said lift bar adapted to engage said loops.

3. A loading device for a vehicle as defined in claim 1, and including spring loaded latches carried by said lift bar and engaging at least some of said loops when the same are engaged by said hooks.

4. A loading device for a vehicle including a hauling bed, said loading device comprising: a single track assembly vertically mounted on said vehicle at one edge of said bed and extending upwardly thereabove, a guide assembly mounted in said track assembly, a stub shaft on said guide assembly and extending in a direction substantially parallel with said edge of said bed, a horizontal lift bar pivotaly mounted on said stub shaft as its sole support and extending from said track assembly as a cantilevered construction and in a direction substantially parallel with said bed, a portable container, means detachably securing said portable container to said lift bar, a rack gear mounted on said track assembly at the top and at one side thereof, a segment gear rigid with and mounted to turn with said lift bar and mesh with said track gear, a hydraulic cylinder parallel with said track assembly and having its piston rod extending upwardly therefrom, and draw bar means connecting the extending end of said piston rod with said guide assembly.

5. A loading device for a vehicle including a hauling bed, said loading device comprising: a track assembly vertically mounted on said vehicle at one edge of said bed and extending upwardly thereabove, a guide assembly slidably mounted in said track assembly, a horizontal lift bar pivotally mounted on said guide assembly as its sole support and extending from said track assembly as a cantilevered construction, and in a direction substantially parallel with said edge of said bed, a portable container, means detachably securing said portable container to said lift bar, a rack gear mounted on said track assembly at the top and at one side thereof, a segment gear rigid with and mounted to turn with said lift bar and mesh with said track gear, a hydraulic cylinder parallel with said track assembly and having its piston rod extending upwardly therefrom and means connecting the extending end of said piston rod with said guide assembly.

References Cited in the file of this patent

UNITED STATES PATENTS

| | | |
|---|---|---|
| 1,763,560 | Amendolara | June 10, 1930 |
| 2,294,354 | Guignard | Aug. 25, 1942 |
| 2,514,825 | Zenko | July 11, 1950 |
| 2,592,324 | Oliver | Apr. 8, 1952 |
| 2,872,237 | Standifer | Feb. 3, 1959 |